(12) United States Patent
Mack et al.

(10) Patent No.: US 8,554,495 B2
(45) Date of Patent: Oct. 8, 2013

(54) HEAD IMPACT ANALYSIS AND COMPARISON SYSTEM

(75) Inventors: Christoph Mack, Seattle, WA (US); Marina Kuznetsova, Brier, WA (US); Scott Votaw, Brier, WA (US); Robert Snook, Kenmore, WA (US)

(73) Assignee: X2 Biosystems, Inc., Seattle, WA (US)

( * ) Notice: Subject to any disclaimer, the term of this patent is extended or adjusted under 35 U.S.C. 154(b) by 344 days.

(21) Appl. No.: 13/009,686

(22) Filed: Jan. 19, 2011

(65) Prior Publication Data

US 2011/0184663 A1 Jul. 28, 2011

Related U.S. Application Data

(60) Provisional application No. 61/336,429, filed on Jan. 22, 2010, provisional application No. 61/409,906, filed on Nov. 3, 2010.

(51) Int. Cl.
*G06F 19/00* (2011.01)

(52) U.S. Cl.
USPC .......... 702/41; 702/44; 702/45; 702/55; 702/104; 2/411; 2/412; 2/422; 2/414; 73/12.04; 73/514.16; 340/573.1; 340/665; 340/569

(58) Field of Classification Search
USPC .......... 702/41, 44, 55, 104; 340/573.1, 340/665, 669; 2/411, 412, 422, 414, 425; 73/12.04, 514.16
See application file for complete search history.

(56) References Cited

U.S. PATENT DOCUMENTS

| | | | |
|---|---|---|---|
| 4,883,271 A | 11/1989 | French | |
| 5,539,935 A | 7/1996 | Rush, III | |
| 5,621,922 A * | 4/1997 | Rush, III | ............................ 2/422 |
| 5,723,786 A | 3/1998 | Klapman | |
| 6,301,718 B1 * | 10/2001 | Rigal | ................................ 2/411 |
| 6,332,226 B1 * | 12/2001 | Rush, III | ............................ 2/412 |
| 6,611,782 B1 | 8/2003 | Wooster et al. | |
| 6,826,509 B2 * | 11/2004 | Crisco et al. | .................. 702/141 |
| 6,925,851 B2 | 8/2005 | Reinbold et al. | |
| 6,941,952 B1 | 9/2005 | Rush, III | |
| 7,526,389 B2 * | 4/2009 | Greenwald et al. | ............. 702/55 |
| 8,322,188 B2 * | 12/2012 | Jeftic-Stojanovski et al. | ............................ 73/12.04 |
| 2002/0060633 A1 * | 5/2002 | Crisco et al. | .................. 340/669 |
| 2002/0169535 A1 * | 11/2002 | Imai et al. | ........................ 701/45 |
| 2005/0177335 A1 * | 8/2005 | Crisco et al. | .................. 702/141 |

(Continued)

OTHER PUBLICATIONS

"Hall Ryan Laboratories Inc.," Wireless Biosensors for Industrial and Sports Safety, Hall Ryan Laboratories Inc., http://hallryan.com/products.html, pp. 4, 2008.

(Continued)

*Primary Examiner* — Carol S Tsai
(74) *Attorney, Agent, or Firm* — Lowe Graham Jones PLLC

(57) ABSTRACT

Systems and methods for head impact injury prediction. A computer implemented method is provided for event based injury predictions. The computer implemented method receives an indication of sensor data related to an impact of a user. The received sensor data is compared to previously stored sensor data in a data store. Each instance of the previously stored sensor data is associated with a medical diagnosis. If the received sensor data matches any of the previously stored sensor data based on the comparison, then an injury risk indicator is generated based on at least one of the medical diagnosis associated with the matching previously stored sensor data or an impact history of the user. The generated indicator is presented.

14 Claims, 10 Drawing Sheets

(56) References Cited

U.S. PATENT DOCUMENTS

| | | | |
|---|---|---|---|
| 2005/0177929 A1* | 8/2005 | Greenwald et al. | 2/425 |
| 2006/0038694 A1* | 2/2006 | Naunheim et al. | 340/665 |
| 2006/0189852 A1* | 8/2006 | Greenwald et al. | 600/300 |
| 2009/0000377 A1* | 1/2009 | Shipps et al. | 73/514.16 |
| 2010/0307223 A1* | 12/2010 | Jeftic-Stojanovski et al. | 73/12.04 |
| 2012/0083688 A1* | 4/2012 | Nauman et al. | 600/419 |
| 2013/0007936 A1* | 1/2013 | Levine et al. | 2/6.6 |
| 2013/0013243 A1* | 1/2013 | Levine et al. | 702/104 |

OTHER PUBLICATIONS

Higgins, et al., "Measurement of Impact Acceleration: Mouthpiece Accelerometer Versus Helmet Accelerometer," Journal of Athletic Training, 2007;42(1):5-10, www.journalofathletictraining.org.

* cited by examiner

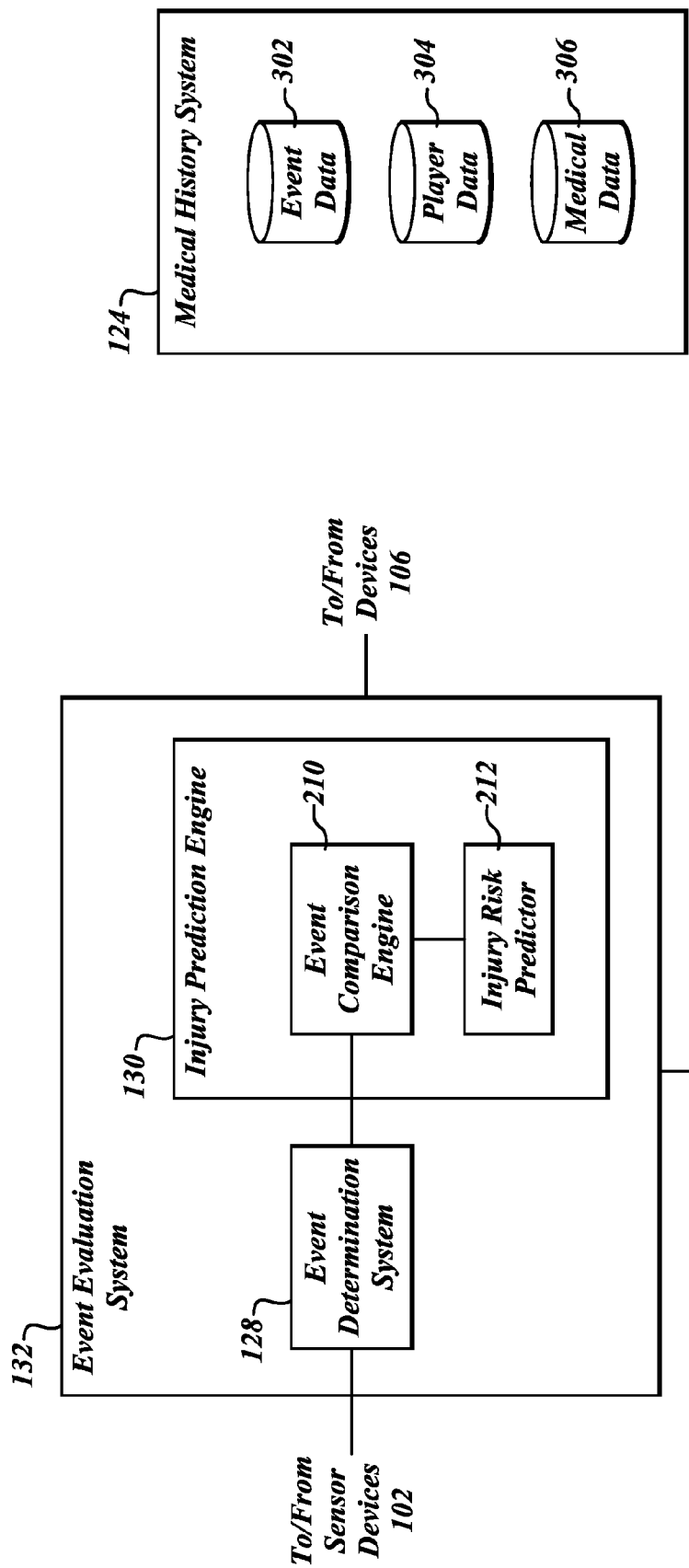

HEAD IMPACT ANALYSIS AND COMPARISON SYSTEM

PRIORITY CLAIM

This application claims the benefit of U.S. Provisional Application Ser. No. 61/336,429 filed Jan. 22, 2010 and U.S. Provisional Application Ser. No. 61/409,906 filed Nov. 3, 2010, the contents of both are hereby incorporated by reference.

BACKGROUND OF THE INVENTION

Participation in athletic activities is increasing at all age levels. All participants may be potentially exposed to physical harm as a result of such participation. Physical harm is more likely to occur in athletic events where collisions between participants frequently occur (e.g., football, field hockey, lacrosse, ice hockey, soccer and the like). In connection with sports such as football, hockey and lacrosse where deliberate collisions between participants occur, the potential for physical harm and/or injury is greatly enhanced. Approximately 300,000 athletes incur concussions in the United States each year. This may be a conservative estimate because many minor head injuries go unreported. Although most concussions occur in high-impact sports, athletes in low-impact sports are not immune to mild traumatic brain injury. Head injuries are caused by positive and negative acceleration forces experienced by the brain and may result from linear or rotational accelerations (or both). Both linear and rotational accelerations are likely to be encountered by the head at impact, damaging neural and vascular elements of the brain.

At the school level, school authorities have become sensitive to the risk of injury to which student participants are exposed, as well as to the liability of the school system when injury results. Greater emphasis is being placed on proper training and instruction to limit potential injuries. Some players engage in reckless behavior on the athletic field or do not appreciate the dangers to which they and others are subject by certain types of impacts experienced in these athletic endeavors. Unfortunately, the use of mouth guards and helmets does not prevent all injuries. One particularly troublesome problem is when a student athlete experiences a head injury, such as a concussion, of undetermined severity even when wearing protective headgear. Physicians, trainers, and coaches utilize standard neurological examinations and cognitive questioning to determine the relative severity of the impact and its effect on the athlete. Return to play decisions can be strongly influenced by parents and coaches who want a star player back on the field.

The same problem arises in professional sports where the stakes are much higher for a team, where such a team loses a valuable player due to the possibility of a severe head injury. Recent medical data suggests that lateral and rotational forces applied to the head and neck area (for example, flexion/extension, lateral flexion, and axial rotation) are more responsible for axonal nerve damage than previously thought. Previous medical research had indicated that axially directed forces (such as spinal compression forces) were primarily responsible for such injuries.

Identifying the magnitude of acceleration that causes brain injury may assist in prevention, diagnosis, and return-to-play decisions. Most field measurements assess the acceleration experienced by the player with accelerometers attached to the helmet. The following show some attempts for measuring the impacts to the skull and brain while the player is participating in a sporting activity. U.S. Pat. No. 5,539,935, entitled "Sports Helmet," issued on Jul. 30, 1996 and U.S. Pat. No. 5,621,922, entitled "Sports Helmet Capable of Sensing Linear and Rotational Forces," issued on Apr. 22, 1997 are examples of some of those attempts. Both patents relate to impact sensors for linear and rotational forces in a football helmet. These devices test the impact to the skull of a player. If an athlete suffers a concussion, for example, it will be possible to determine if the relative magnitude of an impact is dangerously high relative to a threshold to which each sensing device is adjusted, taking into consideration the size and weight of the player.

Another attempt performs testing impact acceleration to the head with an intraoral device which provides acceleration information of the brain in various sports. Other attempts have been made, however all these attempts can be costly to implement and fail to provide full historical medical information to coaches, trainers and medical professionals in real-time for dozens of players at a time on one or more adjacent fields.

SUMMARY OF THE INVENTION

The present invention provides a wirelessly linked sports impact sensing and reporting system. The system mainly includes one or more player electronics modules, a sideline module, and a remotely served and remotely accessible recording database module. In one aspect of the invention, the player module is housed independently within the volume of a set of an otherwise standard mouth guard and chin strap assembly, the sideline module is housed within the structure of an otherwise standard clipboard, and the database module is accessible via a network, e.g., public or private Internet.

In one version of the invention, the player module includes a plurality of sensors capable of detecting impact events in multiple axes, a battery, a data memory storage device, a microprocessor and a LED status indicator array. Each player module includes an RF transducer module and an antenna system, capable of establishing a wireless mesh network for reporting the data associated with an impact to the player. A zinc-air primary cell battery is used with the present player module device, but may be substituted by use of a lithium-polymer rechargeable battery or similar.

In another version of the invention, the sideline module includes a radio system capable of acting as a node on the wireless network and receiving signals from any of the player modules participating on the wireless mesh network in real-time. The sideline module also includes a battery, a data memory storage device, a microprocessor and a display capable of indicating impact information per player on the wireless mesh network, severity of impact, and recommended action in near real-time. The sideline module also includes a loudspeaker capable of generating audible alert tones to attract a coach's attention to incoming information in real-time. A zinc-air primary cell battery is used with the present player module device, but may be substituted by use of a lithium-polymer rechargeable battery or similar.

In still another version of the invention, the database module includes a database of players and associated impact data arrangeable by name, team, date, severity of impact, frequency of impact, and many other parameters. The database module is so constructed to be accessible via the public or private data network and is configured to provide various degrees of access to its information contents. Access accounts may be configured according to individual, team, division, league, physician, and administrator levels. Each account will be granted access to the appropriate set of data only, and password protection will ensure dissemination of data only to authorized parties.

In yet an additional version of the invention, an example system includes a mouth guard having a proximity sensor, an accelerometer, a gyroscope, a processor in signal communication with the accelerometer and gyroscope, a memory in data communication with the processor, a transmitter in signal communication with the processor, and a battery that provides power to the processor, the memory, the accelerometer, and the gyroscope. The processor is configured to allow power from a battery to flow to the accelerometer and gyroscope when the proximity sensor detects that the mouth guard has been inserted into a mouth. The processor is also configured to instruct the transmitter to transmit a signal if an acceleration above a predefined first threshold is sensed and to continue transmitting if an acceleration above a predefined second threshold is sensed before a first time period is complete.

BRIEF DESCRIPTION OF THE DRAWINGS

Preferred and alternative embodiments of the present invention are described in detail below with reference to the following drawings:

FIG. 9 is an example block diagram of example components of an event evaluation system;

FIG. 10 is an example block diagram of example components of a medical history system;

DETAILED DESCRIPTION OF THE PREFERRED EMBODIMENT

Figure 1:
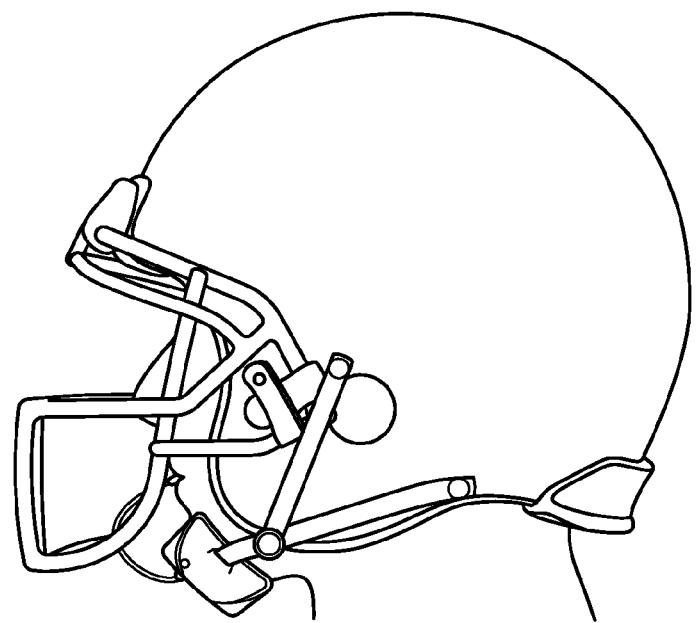
FIG. 1 is a drawing showing an example of the invention in context of a football player's head in profile, while wearing a football helmet and the sensor-enabled mouth guard and chin strap set, i.e. the player module.
Figure 2:
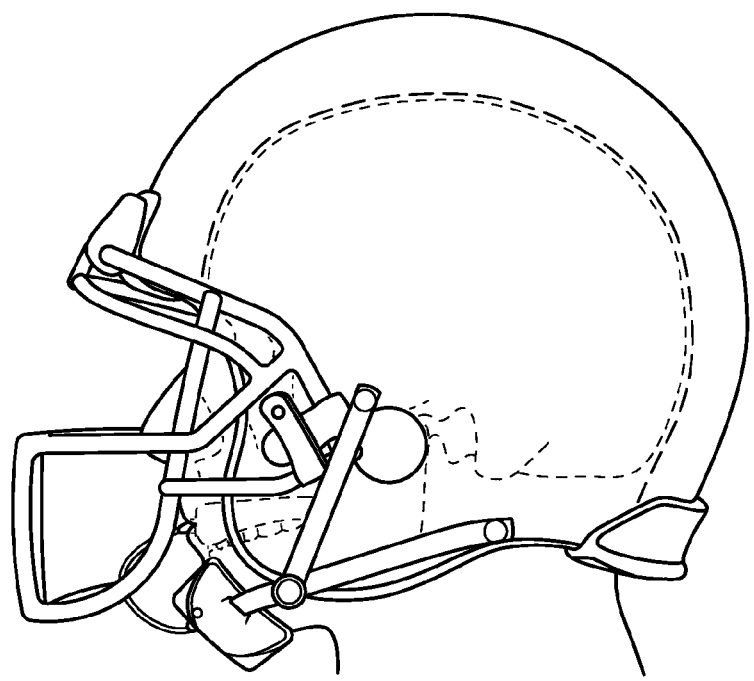
FIG. 2 is a drawing showing the player module in context of its positioning as worn within a human head.

A preferred version of the present invention is a system for the detection, measurement, characterization, transmission, and/or reporting of events causing impact forces to be experienced by players, for example football players. Thus, as shown in FIGS. 1 and 2, a preferred system is configured for use with a mouth guard in a situation in which a player also uses a chinstrap and a helmet. In other examples, various sensors may be incorporated into other housings such as headbands, goggles, or other headgear. The system conveys to an authority figure, preferably a coach or trainer, useful information about the identity of the impacted player, the severity of the impact, and suggested actions for evaluating the condition of the player and for making decisions about the players subsequent status vis-à-vis readiness to return to play or referral to a physician's care.

An example of the player module includes an arrangement of a plurality of low-cost, distributed sensors arranged between the inside surface of the player shell and the bottom surface of a padding elements that provide fit and cushioning to the player's head. These sensors may alternatively be positioned intermediately within the padding element, either at the interface of two laminated elements, or by encapsulation directly within the mass of the padding element. The sensors may also be situated within cavities of the player or in the spaces between padding elements. For example, these sensors may be MEMS type impact sensors, MEMS accelerometers, miniature weighted cantilevers fitted with miniature strain-gauge elements, piezoelectric membranes, or Force-Sensitive-Resistors (FSR).

Figure 3:
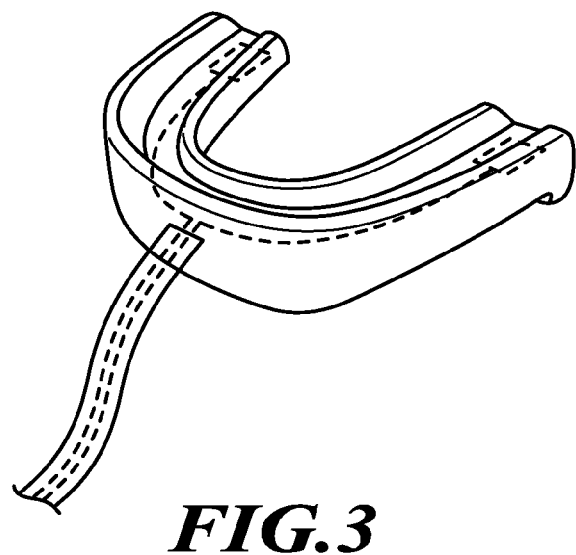
FIG. 3 is a drawing in isometric view showing an example mouth guard element of the player module and indicating the positioning of embedded sensor elements and conductors.
Figure 4:
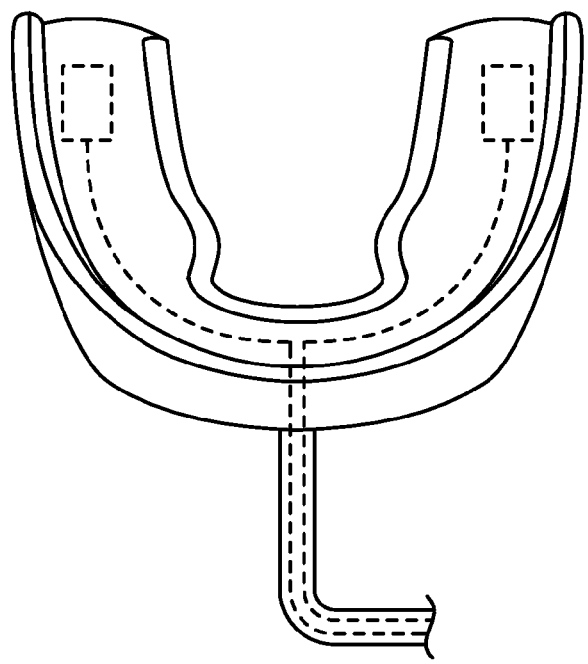
FIG. 4 is a drawing in plan view showing the example mouth guard element of the player module and indicating the positioning of embedded sensor elements and conductors.

In one example, the sensors are incorporated into a sensor unit that is configured as a mouth guard. Thus, as shown in FIGS. 3 and 4, various sensors may be encapsulated into the material formed as a mouth guard. In the illustrated version, sensors are shown being positioned at a lower surface of the mouth guard, beneath the channel formed to receive a user's teeth. As also illustrated, the exemplary mouth guard of FIGS. 3 and 4 includes a wire or tether, preferably encapsulated in a protective covering, extending from a forward portion of the mouth guard in order to send data to a base unit or other device. In other versions, as described below, the mouth guard includes an antenna for wirelessly transmitting the data to an intermediate module or directly to a sideline receiving unit.

Figure 5:
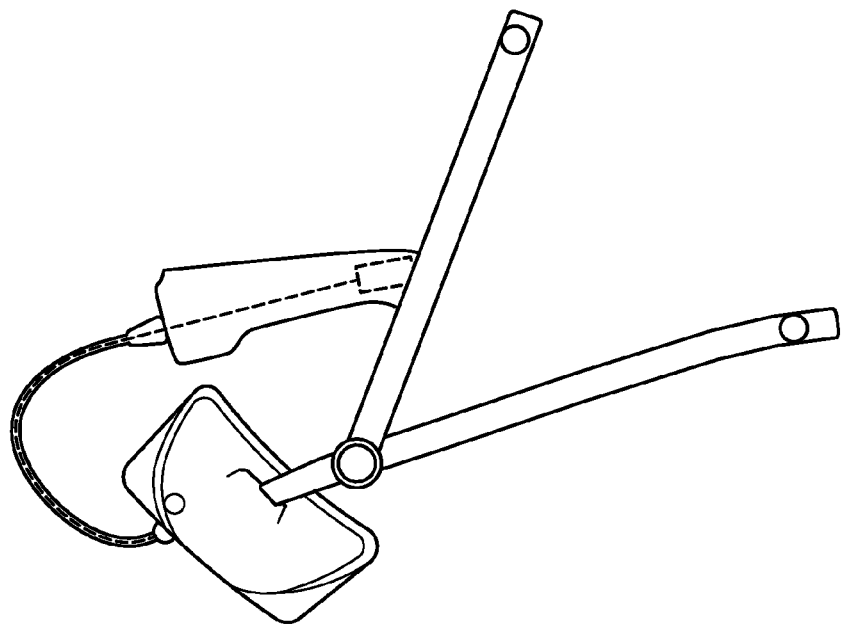
FIG. 5 is a drawing showing a side view of an example player module, including the mouth guard element and chinstrap element, and showing the relationship and connection between the two.
Figure 6:
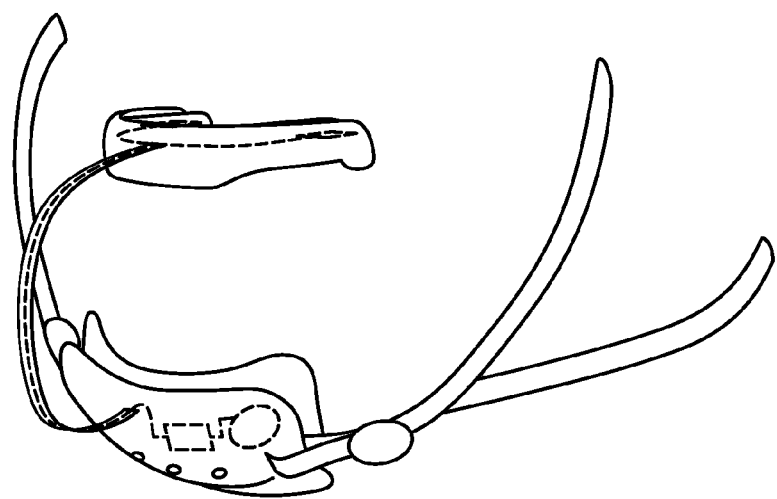
FIG. 6 is a drawing in isometric view showing the player module, including mouth guard and chinstrap elements.

The sensors employed in the player module are connected electronically by means of wires or printed flex circuitry to an electronics pod or other similar means, in some versions situated within a primary shell of the player, and within the space available between two or more padding elements. As illustrated in FIGS. 5 and 6, in some versions the mouth guard sensors are communicatively coupled to a receiving unit contained within a chin strap or other such component external to the mouth. The chin strap includes electronic components to transmit the data received from the mouth guard and then pass it along to a sideline receiving unit. Most preferably the data is passed along in real time, although in some versions the data is stored in a memory and downloaded at a later time.

The electronics pod (whether in the helmet, the mouth guard, the chin strap, or another location) collects, processes, evaluates, and if appropriate, transmits data pertaining to an impact event via radio to one or more other participant nodes of the wireless network to which the player module belongs. The electronics pod contains electronic circuitry having components such as a microprocessor, flash memory, radio module, antenna, and status display LEDs. In the circuit's memory resides a database lookup table for evaluation of sensor data and comparison to combinations of impact levels that represent suspicious likelihood of Mild Traumatic Brain Injury (MTBI) or concussion. The electronics pod is also configured to monitor, evaluate, and/or display system status information such as link to network, battery charge status, and proper system functioning.

Figure 7:
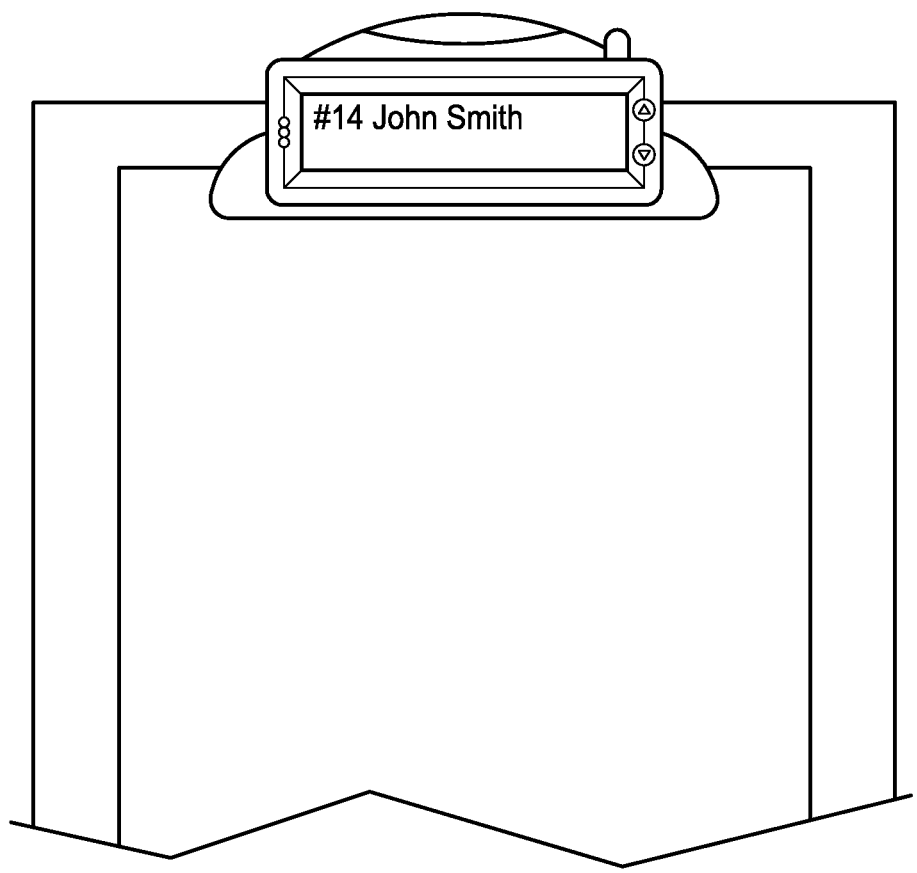
FIG. 7 is a drawing showing a portion of an example sideline module embodied as a clipboard, with a display and input buttons in the uppermost region.

An example sideline module is an electronic data gathering and display device incorporated into a portable enclosure that is easy for a coach, trainer, or other such game official to carry, consult, and interact with during the activities of the practice or game. In one embodiment, the sideline module is embedded into the topmost section of a clipboard, for example as illustrated in FIG. 7. Since the majority of coaches and trainers need to carry clipboards anyway, this is perceived as the most natural and least obtrusive way to provide impact information. However, many other configurations of the sideline module are possible, including building it into a wristband, a stopwatch-style fob with a neck lanyard, a device similar to a mobile phone or pager, etc. The sideline module may be in the form of any electronic receiving device, including laptop computers, mobile phones, or any other such device configurable to receive wireless information. Moreover, the sideline module is described as receiving information directly from the sensor unit, although in some versions of the invention the sensor module may pass its data to an intermediate server or other device which then forwards the information to the sideline module.

The sideline module includes electronic components arranged into a circuit that allows for participation in the wireless mesh network established by a set of player modules, and specifically for the receipt of data transmissions from the player modules, and subsequently the display of impact event information on a visual display in real-time. The sideline module also produces audible and vibratory alert signals to call attention to the arrival of new data messages in real-time, which are disabled by manual conscious intervention of the coach or trainer, indicating acknowledgement of receipt of impact event data.

In one embodiment, the sideline module performs the classification of incoming impact data into one of three categories, indicating differing levels of concern and differing levels of urgency of response. The system employs a "GREEN LIGHT" "YELLOW LIGHT" and "RED LIGHT" system, in which a GREEN LIGHT status indicates the absence of significant impact events for a given player, a YELLOW LIGHT indicates the need for immediate sideline evaluation of the player, and RED LIGHT indicates a severe enough impact that the player be removed from play and referred to a physician immediately.

Upon registering a YELLOW LIGHT impact event, and upon subsequent acknowledgement of receipt of the message by the coach or trainer, the sideline module, in one embodiment, leads the coach or trainer through a simple protocol for evaluation of the player's condition. Through answering a series of simple Yes or No questions, the sideline module guides the coach or trainer to a limited number of possible suggested actions. These potential outcomes could include immediate referral to a physician for further examination, or a period of bench time observation followed by a secondary guided evaluation before allowing the player to return to play.

In one embodiment, a durable record of data transactions is received in real-time and is kept independently of the sideline module or modules. Such a database provides players, parents, coaches, trainers, administrators and other stakeholders access to a record of what impact event information was conveyed, when, to whom and about which player. The sideline module is equipped with a wide area network radio module for transmission of a record of all data transactions on the system with time stamp and a record of the actions by coaches and content of player evaluations. A standard 1 way or 2 way pager system is used, which has the benefit of being inexpensive and nearly ubiquitous in availability throughout much of the world. Alternatives to pager radio systems are cellular radios of various kinds and other wide area network wireless connections. The knowledge that this information will be available to stakeholders provides accountability to all stakeholders in the health and well being of the player.

In one embodiment, the database is populated by an automatic interface to the wide area radio network accessed by the sideline network, and is accessible to stakeholders by means of internet based applications, equipped with password protected hierarchical account structures. The system provides parents the ability to log on to their account and review the totality of impact event data and the record of coach responses associated with their player.

Each player module at the start of each season maps its unique identifier code to a particular player's name and number. It is possible that during the course of events players might accidentally wear the wrong player number and potentially cause confusion by users of the system. It is for this reason that each player module has, in one embodiment, a visual indicator array of LEDs, which will repeatedly flash a visible signal in case of transmission of an impact event of concern. A yellow light flashes to indicate the transmission of a YELLOW LIGHT event, and a red light flashes to indicate the transmission of a RED LIGHT event. When the player is called to the sidelines for evaluation, the coach or trainer can disable the flashing indicator light by simultaneously depressing a button on the player module and a button on the sideline module. This provides positive confirmation that the player who sustained the reported impact is in fact the player being evaluated by the coach or trainer.

Figure 8:
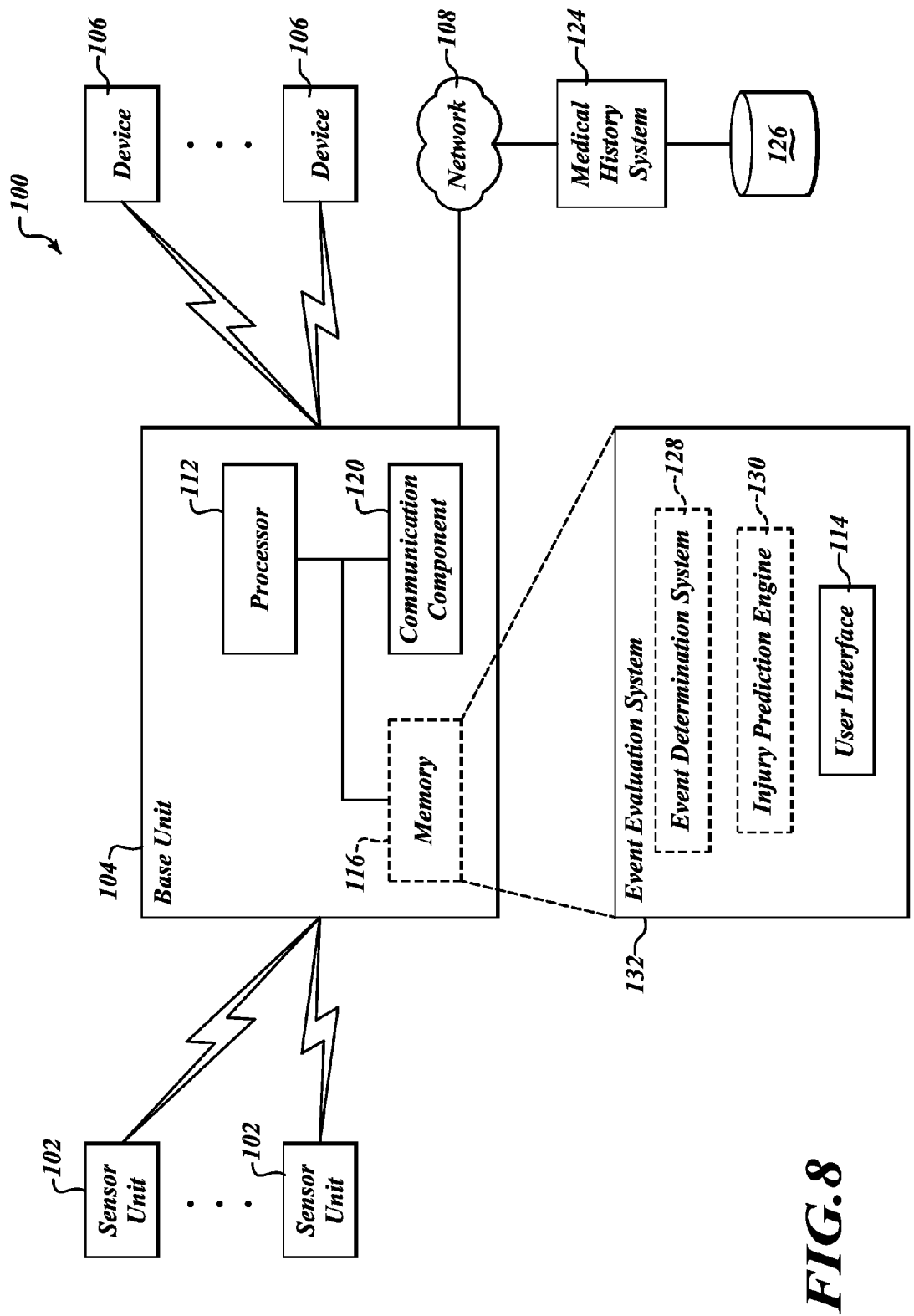
FIG. 8 illustrates an exemplary system formed in accordance with an embodiment of the present invention.
Figure 11:
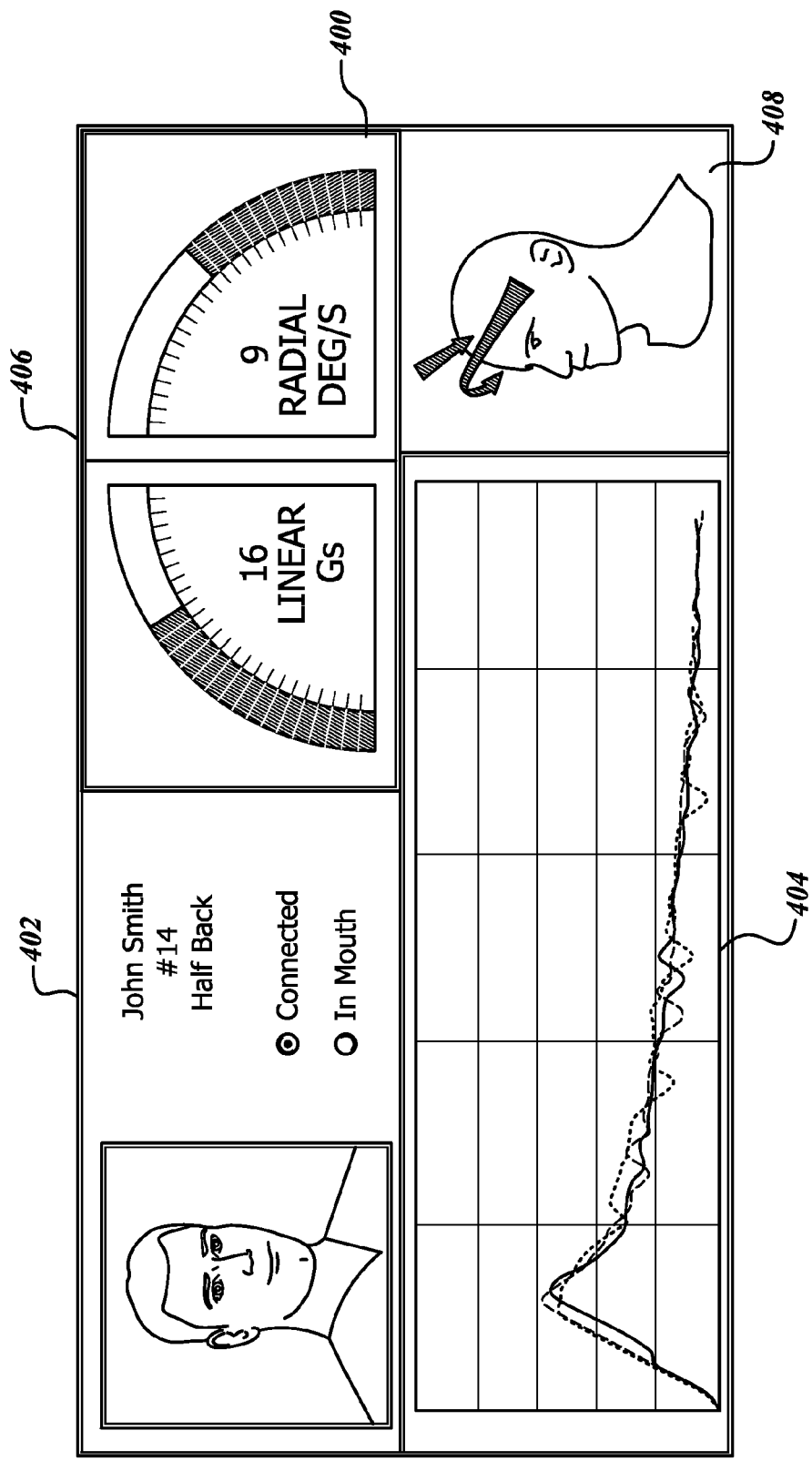
FIG. 11 is an example screen display illustrating aspects of an event evaluation system.

FIG. 8 illustrates an exemplary system 100 that performs aggregation of head-acceleration information received from a plurality of sensor units 102 and makes the acceleration information available to relevant parties. The sensor units are the mouth guards or other components as described above that incorporate one or more sensors. The system 100 includes a base unit 104 that is in wireless communication with one or more sensor units 102 and is optionally in wired or wireless communication with one or more devices 106. As described above, the sensor units may be directly coupled to the base unit, or may alternatively pass their data to the base unit indirectly, through a server, network, or other electronic device. The base unit 104 includes a processor 112, a user interface 114, local memory 116, and a communication component 120. The base unit 104 receives acceleration information wirelessly from each of the sensor units 102 and optionally makes that data available to the one or more additional devices 106.

In some versions, the base unit 104 or any of the devices 106 are in wired or wireless connection with a medical system 124 over a public or private data network 108. The medical system 124 receives acceleration, identification or other information from the base unit 104 or the devices 106 for analysis with regard to stored athlete information and/or storage into a database 126.

In one embodiment, the sensor units 102 include one or more accelerometers or gyros embedded into a device worn on or inside the athlete's head. When a sensor unit 102 has determined that an acceleration or rotational event has exceeded a predefined threshold, the sensor unit 102 transmits identification information of the individual sensor unit and recorded acceleration information associated with the acceleration event that exceeded the threshold.

The communication component 120 of the base unit 104 receives the sensor information from the sensor unit 102 and delivers it to the processor 112. The processor 112 performs a number of optional operations, such as storing the received sensor information into the memory 116, activating an example event evaluation system 132 to analyze the sensor information stored in the memory 116, and/or sends processed or unprocessed sensor information to one or more of the devices 106 or the medical system 124 via the network 108. In one embodiment, the base unit 104 may simply be a wireless router device that would only include maybe just a communication component and a simple router processor.

The devices 106 may be one of a dummy display that includes a communication component for communicating with the base unit 104 or may be a smart computing device that includes a processor, a display and a user interface, such as a computing tablet device, a personal data assistant (PDA), a watch or any comparable device. The device 106 may also include local memory. The event evaluation system 132 may optionally be located in the local memory of the device 106. The device 106 would process, using event evaluation system 132, the sensor information received from the sensor units 102 via the base unit 104. Typical users of the devices 106 might be a team coach, trainer or local medical professional.

An example event evaluation system 132 includes an event determination system 128 that receives sensor information and creates a model of the event. To create a model, an example event determination system 128 translates linear and/or rotational forces from the location of a sensor unit 102 to a center of mass of an athlete's head. The model optionally displays the linear and/or rotational forces on the athletes head.

The example event evaluation system 132 also optionally includes an injury prediction engine 130. The injury prediction engine 130 is optionally predicts an injury to the athlete by comparing the received sensor information to sensor information stored within the medical system 124. As one example, the medical system includes a database of event types that have been associated with injury events, such as one or more of experienced acceleration above a threshold, combined rotation and acceleration above a threshold, repeated events experienced above a threshold within a set period of time, and events having an acceleration vector of a predefined characteristic with respect to the center of mass of the brain. In various implementations of the invention, the database may be stored as a lookup table or may employ branched relationships or artificial intelligence.

In accordance with the preferred version, the evaluation system compares a vector representing acceleration and rotation experienced by a user with a database of prior events associated with injury. When the injury prediction engine 130 discovers similar sensor vector information in the medical system 124, then the injury prediction engine 130 uses the medical diagnosis of the similar sensor information in the medical system 124 to predict an injury to the athlete. The event evaluation system 132 includes a user interface 114 to display event and injury prediction information.

Example embodiments described herein provide applications, tools, data structures and other support to implement an event evaluation system 132 to be used for near real time collection of data. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

FIG. 9 is an example block diagram of example components of an event evaluation system. In one embodiment, the event evaluation system 132 includes one or more functional components/modules that work together to process received sensor information. These components may be implemented in software or hardware or both. The event evaluation system 132, includes a event determination system 128 and an injury prediction engine 130 as mentioned with respect to FIG. 8.

The injury prediction engine 130 includes an event comparison engine 210 and an injury risk predictor 212. The event comparison engine 210 is configured to receive processed sensor data from the event determination system 128. In one embodiment, the event comparison engine 210 receives normalized data from the event determination system 128. The normalized data is preferably in the form of a magnitude and/or vector of an impact. In an embodiment, the event comparison engine 210 also receives rotational data. The event comparison engine 210 is in data communication with a medical history system 126 which stores historical medical and impact data. The medical history system 126 is further described with reference to FIG. 10. The event comparison engine 210 compares the normalized data received from the event determination system 128 to previous impacts stored in the medical history system 126. The event comparison engine 210 attempts to match sensor data, player characteristics such as size and weight, number of impacts for a player, and/or prior medical history of the player to previous events in the medical history system 126.

In one embodiment, the event comparison engine locates one or more similar impacts within the database, and then gathers their corresponding medical outcome. For example once an impact is determined to be similar, the event comparison engine 210 will determine what the medical result, (i.e. concussion or no concussion) happened to a player as a result of the impact. Based on the prior outcomes for similar events, the engine produces an output indicative of the predicted outcome. The output may be weighted as a function of the percentage of injury outcomes experienced by others for similar events, as well as the severity of such injuries for similar events.

The injury risk predictor 212 is configured to receive the sensor data, with corresponding medical results, from the event comparison engine 210. The injury risk predictor 212, using all of the received data attempts to predict a likelihood of an injury to the player. While not a medical evaluation, this prediction can be used by a coach, trainer, parent, caregiver or doctor to determine a potential for injury and continue to monitor the player, or run medical testing before another impact potentially makes the problem worse. One such prediction algorithm includes the following formula when attempting to predict an injury. The injury risk predictor 212, in one embodiment, uses the most closely related historical impact data from the medical history system 126 and its corresponding medical result, and then sends the medical result to a mobile device 214 as a prediction as to what may be the medical result of the received sensor data. In alternate embodiments the injury prediction engine 130 may be a neural network.

FIG. 10 is an example block diagram of example components of a medical history system. The medical history system 300 is configured as a data store and contains event data 302, player data 304 and medical data 306. The medical history system 300 may also contain, medical recommendations, historical medical study data, age related data, and/or sensor related data. The medical history system 300 stores the historical event information of each impact, to include the impact sensor data and the resultant medical condition (i.e. returned to play, concussion, ended play as a precaution, etc.). This data is used by an injury prediction engine such as injury prediction engine 130 described with reference to FIG. 9 to predict future injuries. The medical history system 300 may also include a player data store 304 which contains information about a particular player. Information stored in the player data store 304 may include information such as impact history, size, body characteristics, and other sports related data such as data from other sports the player plays. The medical data store 306 may include information about particular impacts that are known to cause injury or the potential for a future injury. It may also include default settings for a particular age group, size of a player, study data, and/or doctor diagnosis of particular impacts.

FIG. 10 is an example screen display illustrating aspects of an event evaluation system. FIG. 10 depicts a user interface 400 that is an interface for interacting with an event evaluation system, such as the event evaluation system 132 of FIG. 9. The interface 400 includes a graphical representation of sensor data, such as acceleration data shown in a screen area 404. Screen area 404 is located in the bottom left corner of the screen, however in alternate embodiments may be located elsewhere on the screen or shown in response to selection of a button (not shown) by a user.

The interface 400 includes an indication of a player, and optionally contains his/her number and if the system is connected in a screen area 402. The system connected indication includes an indication of connection of the player's sensor device to the system and an indication of the presence of a sensor device in the mouth of the player. Screen area 402 optionally may be used to indicate to a coach, trainer or a parent that a player's data is not being received by the system. Screen area 402 is located above screen area 404 and shares a top half of the user interface 400 with screen area 406.

A magnitude of the most recent sensor information is shown in a screen area 406. The magnitude is optionally shown in the form of a dial, but also may just include numbers, or other indicating methods. The indication of screen area 406 is configured to quickly display to a coach, trainer, or health care provider the magnitude of the most recent impact.

A model of the most recent sensor information on a human form is shown in a model area 408. The model area 408 is located in the bottom right corner of the user interface 400. The model includes a rotatable human skull that contains an indication in the form of an area of a vector of impact and an arrow indicating a rotational path of the head. The interface 400 is used to show information to a coach, trainer, caregiver, or health care provider relating to the most recent event. The interface 400 may be used as a tool to determine whether a player has suffered an injury.

Figure 12:
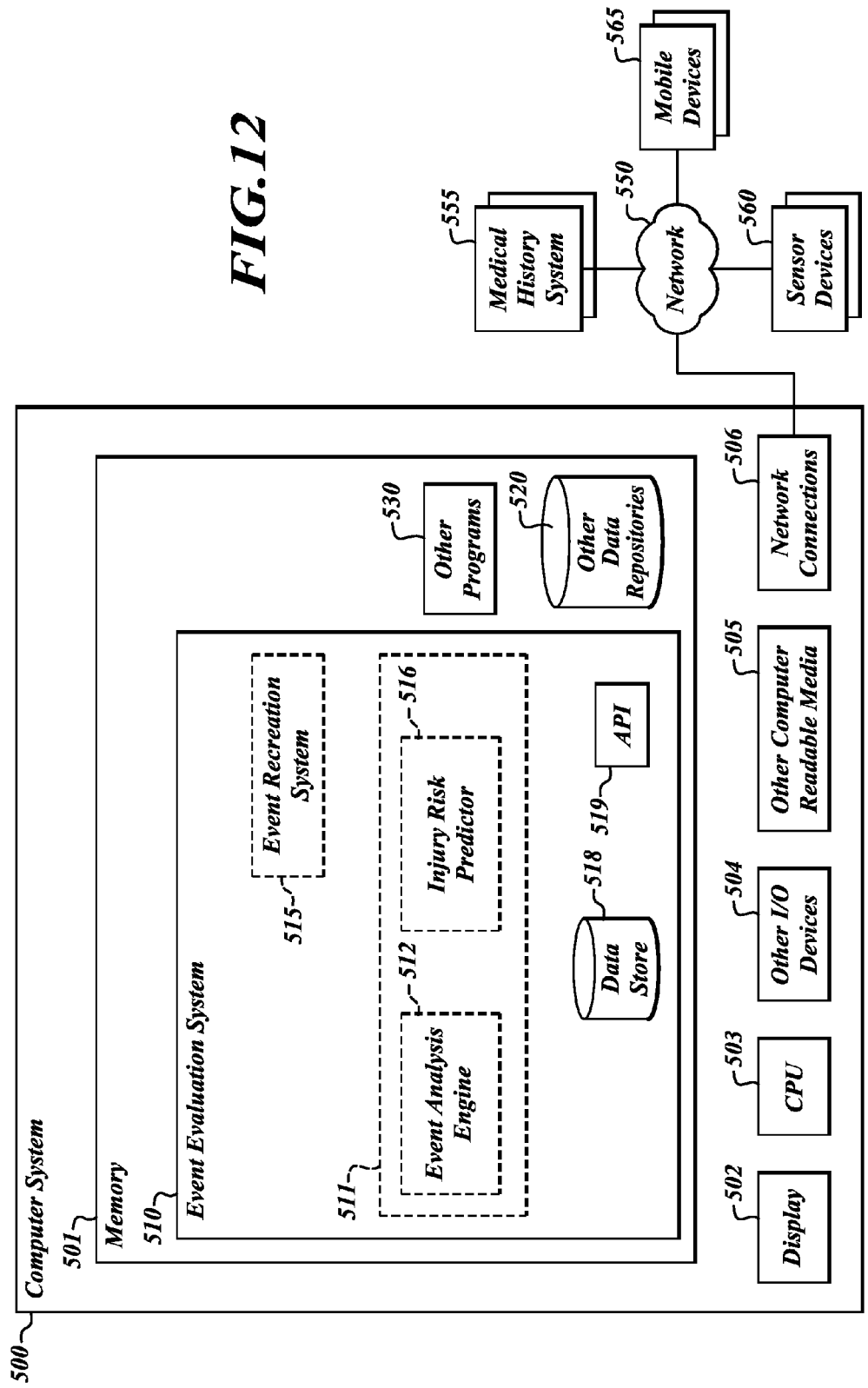
FIG. 12 is an example block diagram of an example computing device for practicing embodiments of an event evaluation system.

FIG. 12 is an example block diagram of an example computing device for practicing embodiments of an event evaluation system. In particular, FIG. 12 shows a computing system 500 that may be utilized to implement an event evaluation system 510. Note that one or more general purpose or special purpose computing systems/devices may be used to implement the event evaluation system 510. In addition, the computing system 500 may comprise one or more distinct computing systems/devices and may span distributed locations. Furthermore, each block shown may represent one or more such blocks as appropriate to a specific embodiment or may be combined with other blocks. Also, the event evaluation system 510 may be implemented in software, hardware, firmware, or in some combination to achieve the capabilities described herein.

In the embodiment shown, computing system 500 comprises a computer memory ("memory") 501, a display 502, one or more Central Processing Units ("CPU") 503, Input/Output devices 504 (e.g., keyboard, mouse, CRT or LCD display, and the like), other computer-readable media 505, and network connections 506. The event evaluation system 510 is shown residing in memory 501. In other embodiments, some portion of the contents, some or all of the components of the event evaluation system 510 may be stored on and/or transmitted over the other computer-readable media 505. The components of the event evaluation system 510 preferably execute on one or more CPUs 503 and extract and provide quotations, as described herein. Other code or programs 530 (e.g., an administrative interface, a Web server, and the like) and potentially other data repositories, such as data repository 520, also reside in the memory 501, and preferably execute on one or more CPUs 503. Of note, one or more of the components in FIG. 12 may not be present in any specific implementation. For example, some embodiments may not provide other computer readable media 505 or a display 502.

In a typical embodiment, as described above, the event evaluation system 510 includes an event determination system 515 and an injury prediction engine 511. The injury prediction engine 511 includes an event comparison engine 512, and an injury risk predictor 516. The injury prediction engine 511 performs functions such as those described with reference to the injury prediction engine 130 of FIG. 9. For example, the injury prediction engine 511 receives sensor information and/or sensor data and uses the sensor information to predict a likelihood of an injury to a human head or other body part.

The event evaluation system 510 interacts via the network 550 with (1) a medical history system 555, (2) mobile devices 565 and/or (3) sensor units 560. The network 50 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The mobile devices 565 include desktop computing systems, notebook computers, mobile phones, smart phones, personal digital assistants, and the like.

In an example embodiment, components/modules of the event evaluation system 510 are implemented using standard programming techniques. For example, the Event evaluation system 510 may be implemented as a "native" executable running on the CPU 503, along with one or more static or dynamic libraries. In other embodiments, the Event evaluation system 510 may be implemented as instructions processed by a virtual machine that executes as one of the other programs 503. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the Event evaluation system 510, such as in the API 519, can be made available by standard mechanisms such as through C, C++, C#, and Java APIs; libraries for accessing files, databases, or other data repositories; through languages such as XML; or through Web servers, FTP servers, or other types of servers providing access to stored data. The data store 518 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the event evaluation system 510 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 13:
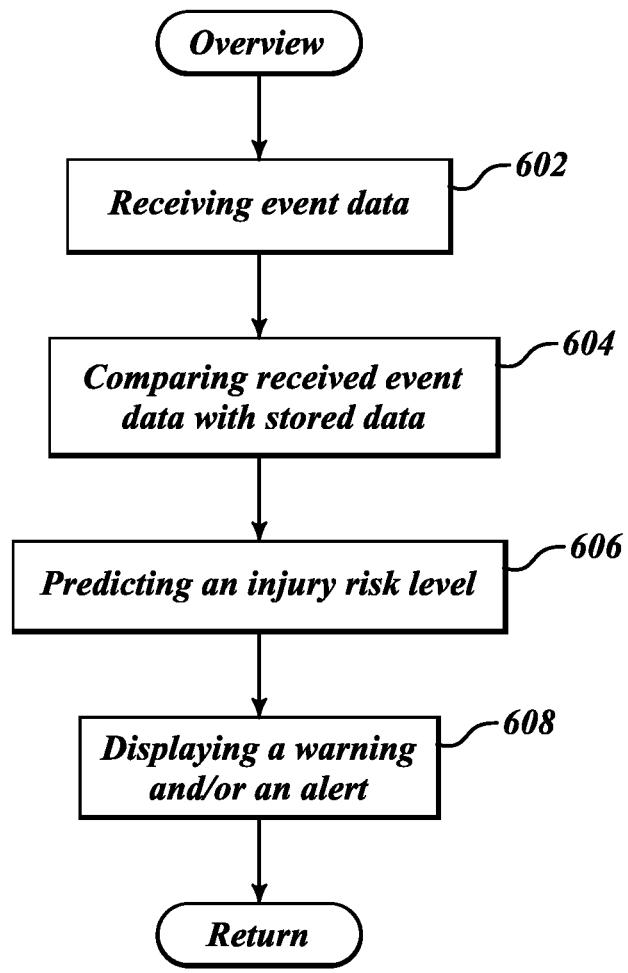
FIG. 13 is an example flow diagram of example components of an event evaluation system.

FIG. 13 is an example flow diagram of example components of an event evaluation system. FIG. 13 illustrates an overview of the operation of an event evaluation system such as the event evaluation system 132 shown with reference to FIG. 9. At block 602 the event evaluation system receives an indication of an event in the form of sensor data and/or sensor information. Generally when an event occurs sensor data is either transmitted from the sensor device wireless or is later downloaded through a wired connection. In one embodiment a visual indicator on a mouth guard could be used to prompt a player to transmit sensor data to the event evaluation system. The received data may be received from a number of sources such as MEMS type impact sensors, MEMS accelerometers, and miniature weighted cantilevers fitted with miniature strain-gauge elements, piezoelectric membranes, or Force-Sensitive-Resistors (FSR). At block 604 the sensor data is compared with stored sensor data. The stored sensor data may be located on a mobile device, a base station and/or a remote medical history system. The comparison attempts to determine the historical events that are the most similar to the received sensor data (for example, in terms of magnitude, duration, rotation, or other aspects). The sensor data may also include information about a player. At block 606, an injury risk level is predicted. Once the most similar impact and player is determined, then the system optimally determines the historical player's medical diagnosis as a result of the determined similar impact. Once the historical players diagnosis is know, that diagnosis is applied as a prediction for the current event. One embodiment of an injury risk level prediction is further described with reference to FIG. 13. At block 608, a waning and/or alert is sent to a user device to notify a user of a potential injury. After block 608 the process ends.

Figure 14:
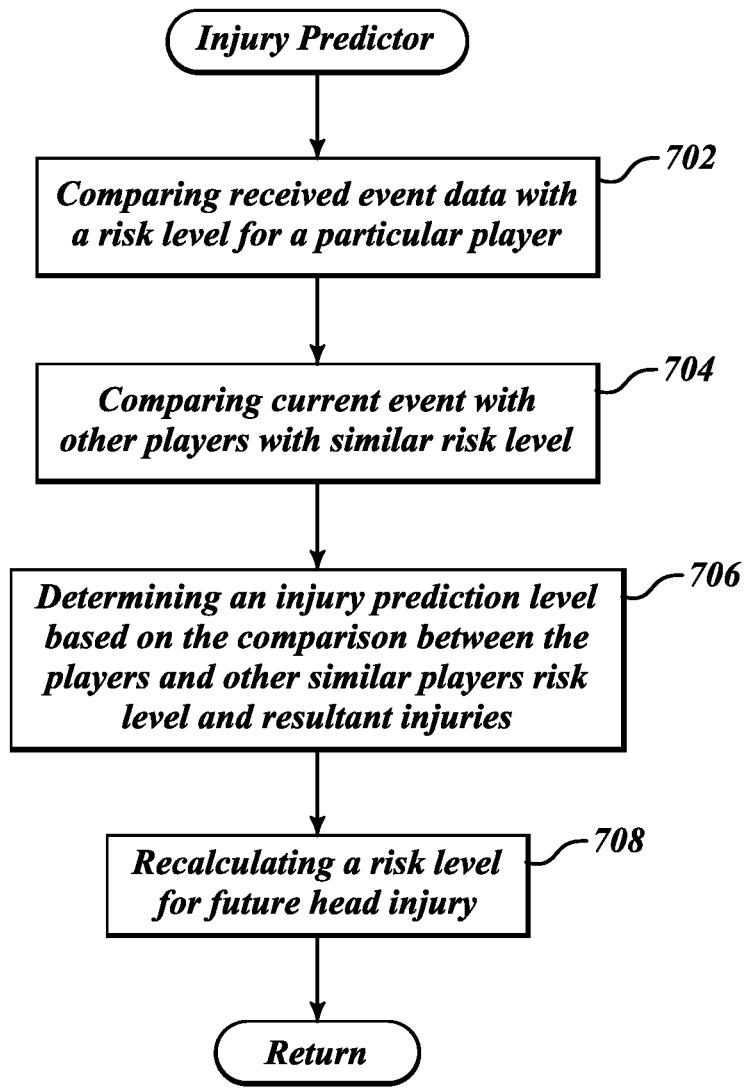
FIG. 14 is an example flow diagram of example components of an injury prediction system.

FIG. 14 is an example flow diagram of example components of an event evaluation system. FIG. 14 illustrates an overview of the operation of an injury risk predictor, in one embodiment, such as the injury risk predictor 224 shown with reference to FIG. 9. At block 702 received sensor data is compared with historical sensor data to find the most similar match or matches. In one embodiment this data is compared to a current risk level for a player. The risk level determined over time as the player receives multiple impacts or is a set default in the system. At block 704, an injury risk prediction level is determined based on the comparison between the players and other similar players with a similar risk level and similar sensor data. The comparison is made to determine the impact and player that is most like the current player and the current received sensor data. Once the most similar impact and player is determined, then the system will determine that player's medical diagnosis as a result of the similar impact. The medical diagnosis of the player is used to recalculate, at block 708, a player's risk level for future head injuries.

Although the techniques of the event evaluation system are generally applicable to any type of sensor data related to a head impact, the concepts and techniques described here are applicable to other types of sensor data to include sensors on other parts of the body and to sensors on other devices like vehicles. Essentially, the concepts and techniques described are applicable to any sensor collection environment. For example in detecting and processing an explosive charge and modeling its effects on a body or during a car accident to predict injuries to a body. Also, although certain terms are used primarily herein, other terms could be used interchangeably to yield equivalent embodiments and examples. In addition, terms may have alternate spellings which may or may not be explicitly mentioned, and all such variations of terms are intended to be included.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege Claimed are defined as follows:

1. A computer implemented method for head impact analysis comprising:
    receiving impact data related to an impact parameter for an impact event experienced by a head of a user;
    comparing the impact data to previously stored impact parameter data in a data store, wherein the previously stored impact parameter data is associated with prior impact events, the previously stored impact parameter data further being organized into a plurality of categories in accordance with a plurality of outcomes associated with the prior impact events; and
    generating an association between the impact event and one or more of the prior impact events, wherein generating an association comprises associating the impact event with one of the plurality of categories.

2. The computer implemented method of claim 1, wherein the previously stored impact parameter data comprises acceleration and rotation information for the prior impact events, and further wherein the prior impact events are derived from a plurality of persons.

3. The computer implemented method of claim 1, further comprising recommending an assessment of the user based on the generated association.

4. The computer implemented method of claim 1, wherein the step of comparing further comprises comparing a magnitude and a direction of the impact parameter with a plurality of magnitudes and directions of previously stored impact parameter data.

5. The computer implemented method of claim 1, wherein the data store further comprises a physical characteristic of persons associated with the prior impact events and the step of comparing further comprises comparing a physical characteristic of the user to the physical characteristic associated with the prior impact events.

6. The computer implemented method of claim 1, wherein the data store further comprises an indication of whether persons associated with the prior impact events experienced a concussion and the step of generating an association further comprises associating the impact event with at least one prior impact event indicating a concussion.

7. The computer implemented method of claim 6, further comprising determining a percentage of associated events in which the prior impact events experienced a concussion.

8. A computer system configured to analyze head impact events, comprising:
    a sensor configured to be worn on the head of a user, the sensor configured to detect a head impact parameter;
    a processor; and
    a memory, the memory in communication with the sensor, the memory further having stored programming instructions operable by the processor to:
        receive the impact parameter data related to an impact parameter for an impact event experienced by the head of a user;
        compare the impact parameter data to previously stored impact parameter data in a data store, wherein the previously stored impact parameter data is associated with prior impact events and is organized into a plurality of categories in accordance with a plurality of outcomes associated with the prior impact events; and
        generate an association between the impact event and one or more of the prior impact events including by associating the impact event with one of the plurality of categories.

9. The computer system of claim 8, wherein the previously stored impact parameter data comprises acceleration and rotation information for the prior impact events, and further wherein the prior impact events are derived from a plurality of persons.

10. The computer system of claim 8, wherein the stored programming instructions further cause the processor to recommend an assessment of the user based on the generated association.

11. The computer system of claim 8, wherein comparing further comprises comparing a magnitude and a direction of the impact parameter with a plurality of magnitudes and directions of previously stored impact parameter data.

12. The computer system of claim 8, wherein the data store further comprises a physical characteristic of persons associated with the prior impact events and comparing further comprises comparing a physical characteristic of the user to the physical characteristic associated with the prior impact events.

13. The computer implemented method of claim 8, wherein the data store further comprises an indication of whether persons associated with the prior impact events experienced a concussion and generating an association further comprises associating the impact event with at least one prior impact event indicating a concussion.

14. The computer implemented method of claim 13, wherein the stored programming instructions further cause the processor to determine a percentage of associated events in which the prior impact events experienced a concussion.

* * * * *